April 3, 1962 R. L. L. CASCARINE 3,027,950
AGRICULTURAL MACHINE WITH AUTOMATIC CONTROL
Filed May 24, 1960 5 Sheets-Sheet 2
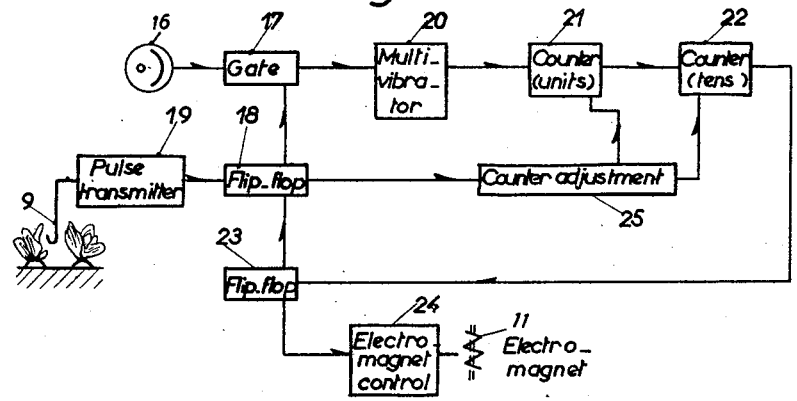
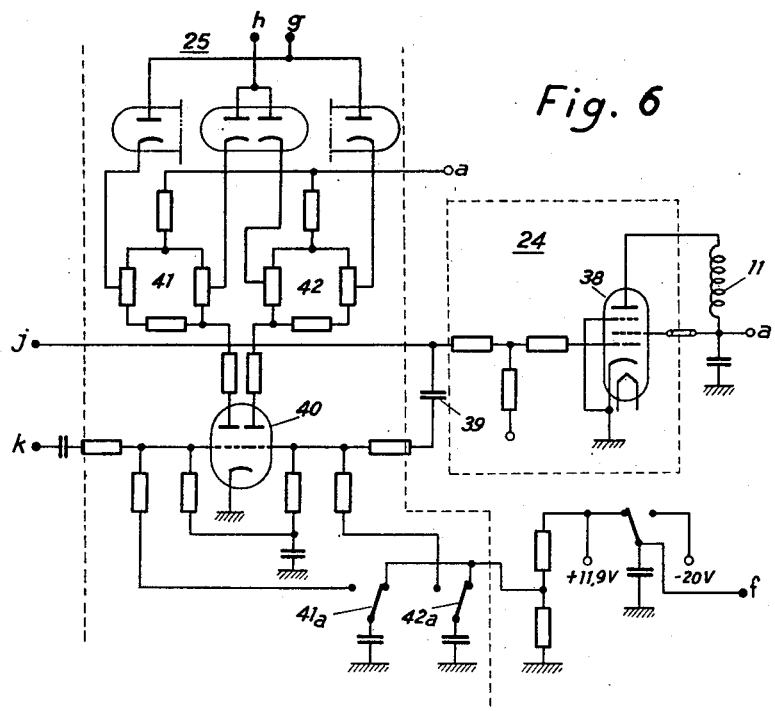
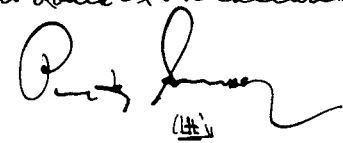

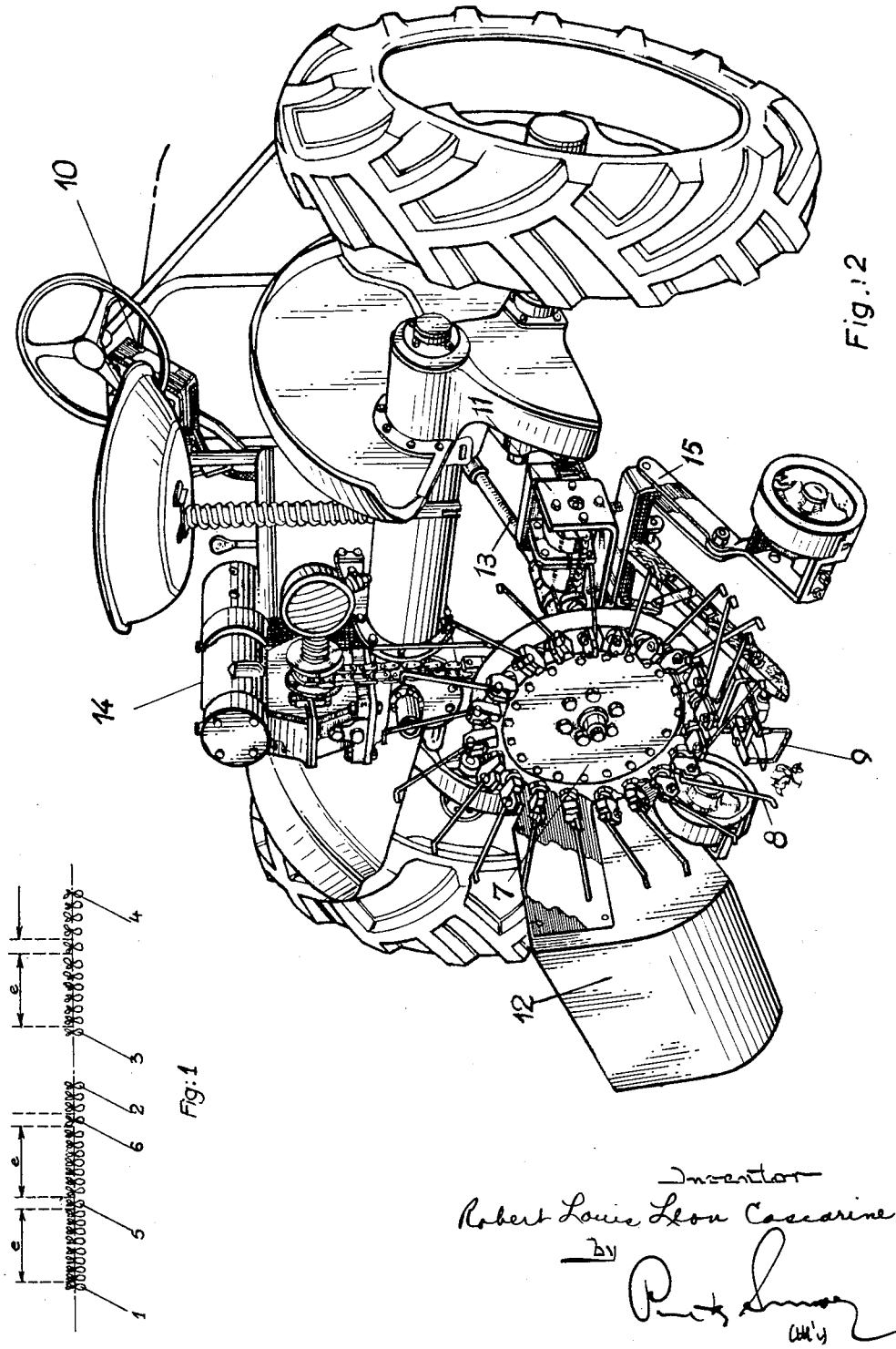

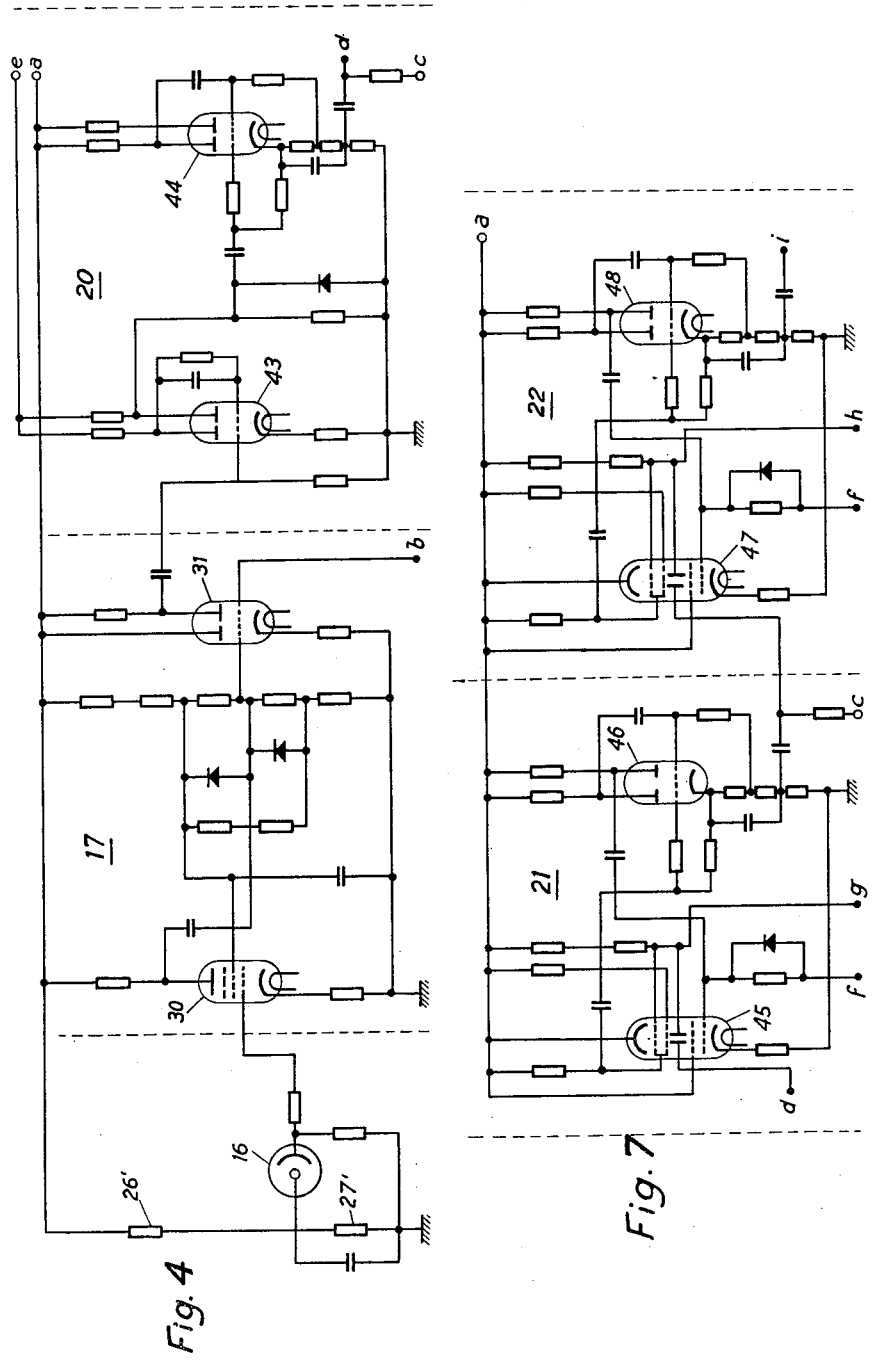

April 3, 1962     R. L. L. CASCARINE     3,027,950
AGRICULTURAL MACHINE WITH AUTOMATIC CONTROL
Filed May 24, 1960     5 Sheets-Sheet 5
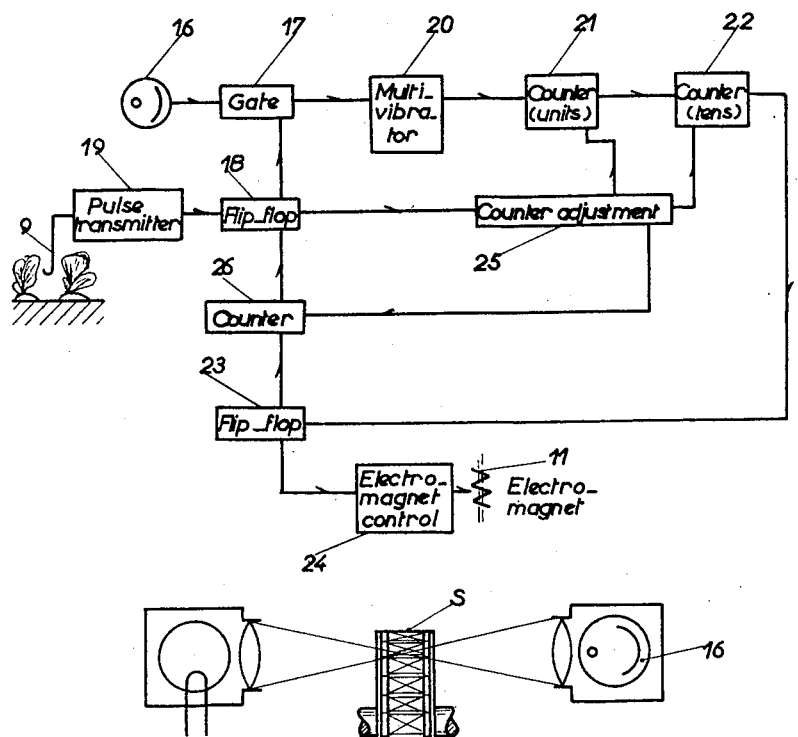
Fig.: 3a
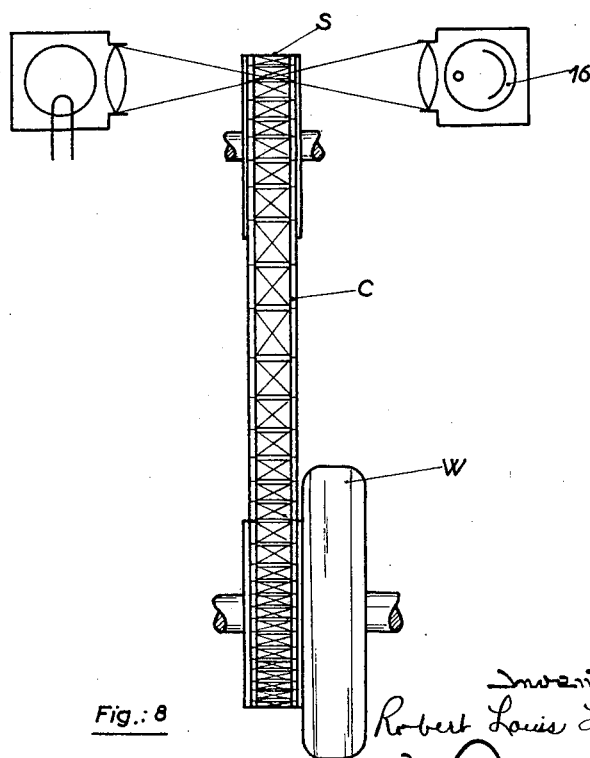
Fig.: 8

3,027,950
AGRICULTURAL MACHINE WITH AUTOMATIC CONTROL

Robert Louis Leon Cascarine, Antwerp, Belgium, assignor to S.E.B.M.A. S.A., Societe d'Exploitation des Brevets de Machines Agricoles, a company of Switzerland
Filed May 24, 1960, Ser. No. 31,363
Claims priority, application France May 27, 1959
3 Claims. (Cl. 172—5)

The present invention relates to the automatic control of the implements of an agricultural machine, for example a beetroot thinning machine.

Thinning, in the cultivation of beetroot, is an operation which is carried out during the growth of plants sown in rows and which grow either very close to each other or otherwise. The operation consists in destroying a certain number of these plants so as to permit of the normal growth of those plants which remain.

One row of beetroot plants to be thinned usually has the appearance shown in FIG. 1 of the accompanying drawings. A first plant 1 is followed up to 2 by plants which are concentrated over a limited distance. From 2 to 3, there is a space which is devoid of plants as a consequence of bad germination. A new series of plants begins at 3 and continues up to 4.

Thinning has for its object to form a minimum free space e between the plants. This result is obtained by removing all the plants located in the space e after the plant 1, while retaining the plant 5, further destroying the plants growing along the space e beyond 5, and saving the plant 6, destroying the remainder of the plants bunched together up to 2 (the space 6—2 being less than e) and repeating the same procedure starting from the first plant 3 which is retained, on condition, of course, that the space 6—3 is greater than e.

A thinning operation of this kind is carried out on an industrial scale by means of an agricultural machine, a model of which is illustrated in FIG. 2.

This machine comprises a rotary cutter 7 mounted on a tractor and provided with knives 8 adapted to effect the destruction of all plants located along their path, the said knives being moved aside to save the plants which are intended to remain. The control for moving the knives aside is effected automatically in dependence on a feeler 9 located in proximity to the cutter, a little in front of this latter in the direction of motion of the tractor. The reaction of the feeler when in contact with a plant is transmitted to a suitable electronic device housed in a box 10 in front of the driver's seat, this device being arranged so as to interpret the reaction of the feeler and consequently to produce the suitable signals controlling the knives, and effect the excitation and de-energization of an electro-magnet 11 which causes the knives either to be retracted or to be extended for use.

In this FIGURE 2, there can also be seen a mudguard at 12, the mechanical transmission at 13, an electric lifting jack at 14 and the rear wheel system at 15.

The present invention relates to an agricultural machine of the type described above. The object of this invention is to provide an electronic control of the implements of the said machine operating with great precision as a function of the forward motion of the tractor.

In the accompanying drawing:

FIG. 1 is a diagrammatic view in horizontal projection of a row of plants, illustrating the principle of the thinning operation as explained in the introductory part of the present description.

FIG. 2, to which reference has also been made in the introduction, is a view in perspective of the agricultural machine.

FIG. 3 is a synoptic diagram of the electronic device.

FIG. 3a is a similar diagram of a slightly modified form.

FIGS. 4, 5, 6 and 7 are detailed circuit diagrams indicating an embodiment of the electronic device, and FIG. 8 shows diagrammatically the control system of the light beam energizing a photocell.

Figure 5:
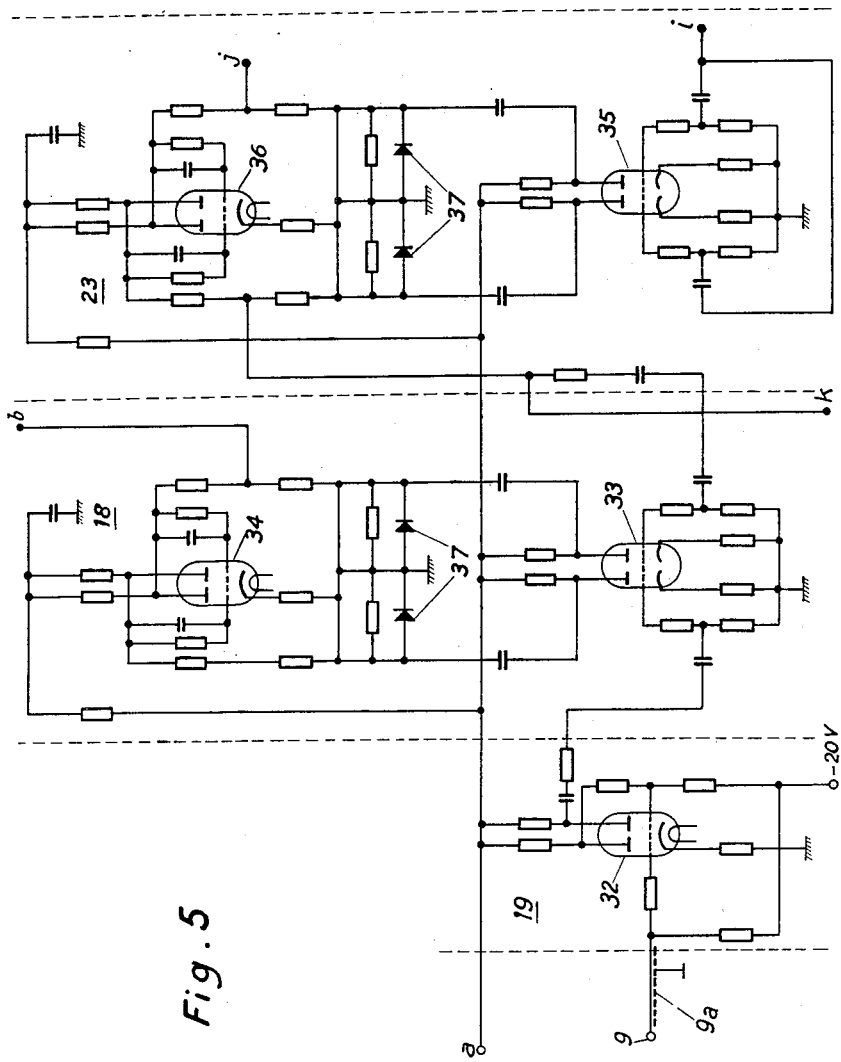

In the form of embodiment which is illustrated in the drawing, a photo-electric cell forming part of the impulse generator has been illustrated diagrammatically at 16 (FIGS. 3, 3a and 8). The light beam received by this cell is cut off by a movable shutter at a speed which depends on the speed of the forward motion of the agricultural machine. This movable shutter can be constituted by a Maltese cross, a perforated disc, a toothed wheel or any other suitable member, driven by the movement itself of the machine. The shutter could be especially coupled by any suitable system of transmission, such as sprocket and chain C, to one of the wheels W of the tractor, preferably a non-driving wheel. The impulses created by the cell are therefore a function of the forward motion of the vehicle or, in other words, each impulse emitted corresponds to a pre-determined distance covered by the said vehicle over the ground. This amounts to saying that the impulse generator is an apparatus for the accurate measurement of the movement of the agricultural machine.

It will be understood, however, that an impulse generator of a different type could be employed, for example an electrostatic (variable capacity) generator, an electromagnetic generator (variable air-gap or flux) or a purely electric generator of the rotating commutator type, the only condition to be respected being that the recurrent variation has for its origin the movement of the machine.

The impulses emitted by the generator 16 are applied to a stage 17 at which they are amplified before arriving at a "gate." This latter only opens on reception of a signal coming from a flip-flop 18 under the action of a contact established by the feeler 9 with a plant, this action being represented by an impulse transmitted to the flip-flop by means of a suitable circuit 19.

The opening of the gate 17 permits the impulses produced by 16 to pass towards a mono-stable multi-vibrator stage 20 and from thence to a double impulse counter 21—22 counting the units and tens respectively.

When the counter has recorded a pre-determined (small) number of impulses, it emits a signal which is applied to a second electronic flip-flop 23; this latter reflects back this signal to the supply stage 24 of the electro-magnet 11 and produces in the example illustrated in FIG. 3 the de-excitation of this latter: the implements of the cuter are then put into action.

Continuing to carry out its function, the counter records a second pre-determined (large) number of impulses and emits a new signal which causes 23 to rock back. There then follows a double action: on the one hand, the electro-magnet 11 is re-excited, causing the withdrawal of the implements and, on the other hand, the flip-flop 18 is restored to its original state, thereby becoming receptive to any impulse coming from 19 and locks the gate 17, in such manner that the train of impulses set up by 16 is no longer directed towards the counter 21—22. This latter will be put back into service only if and when he feeler 9 again detects a plant, the same procedure being again repeated.

The pre-determination of the two numbers—the small number and the large number—which must be counted at 21—22 is carried out by means of a suitable circuit 25 designed to provide individual adjustment for each of the numbers indicated.

In the example illustrated in FIG. 3a, the sequence of operation of the electromagnet 11 is reversed: the implements of the cutter would normally be in operative position, the first signal would cause them to retract and the second signal to return to operative position. In this example, the block diagram is the same as that of FIG. 3 supplemented by a third counter 26 interposed between the flip-flops 18 and 23 and adjusted by the counter adjustment stage 25. This additional counter 26 causes the electronic gate 17 to close until the feeler 9 detects a plant.

FIGS. 4 to 7 show the circuit details of a form of embodiment conforming to the synoptic diagram of FIG. 3, the alphabetical letters of reference representing when they indicate a black dot, the interconnections which permit the general reconstitution of the various figures and, when the said letters of reference indicate a small circle, they represent the connection to a suitable voltage source.

In FIG. 4, the photo-electric cell 16 is of a standard type. Its anode is brought to a positive potential by a voltage divider 26'—27' connected on to a line $a$ at a suitable voltage, while the cathode is coupled to an amplifier tube 30, the anode of which is connected to a double triode 31 or so-called "co-incidence selector." The control grid of the second half-triode 31 is coupled (through $b$) to a device which will be described below and the action of which has the effect of allowing the passage of the impulses coming from the cell 16.

FIG. 5 shows the feeler 9 connected to a valve 32, the polarization of which is fixed by an independent source. This valve is mounted as a blocked oscillator which is released by the modification of the input potential (the usefulness of such an assembly or circuit will be understood in the description which follows below). After differentiation, the impulse coming from 32 is sent on to a valve 33 which constitutes, together with a tube 34, a bi-stable device. The tubes amplify two positive impulses on two channels.

A second bi-stable unit 35—36, similar to the first, supplies at its output terminals two square-topped waves which are complementary to each other. The tubes 34 and 36 are multi-vibrators, while the crystal diodes 37 prevent positive impulses from releasing the multi-vibrators.

The output impulse, which rises in one example of embodiment from 29 to 42 volts, is applied on the one hand, (through $j$) to control the grid of the tube 38 of the electro-magnet 11 (see FIG. 6) and, on the other hand, through a differentiator condenser 39 on to the grids of a double triode 40 the anodes of which are connected to predetermination potentiometers 41 for the small number and 42 for the large number.

One of the impulses of the second bi-stable device 35—36 (FIG. 5) is applied to the input circuit of the tube 33 of the first bi-stable unit 33—34. The output impulse of this first bi-stable unit (transmited by $b$), releases the grid of the tube 31, as indicated above with reference to FIG. 4.

The impulses are then sent on to the tube 42 which operates as a mon-stable multi-vibrator; the output impulse of this latter is transmitted, across a differentiator system, to a tube 44 which also works as a mono-stable multi-vibrator and the output impulse of which (at $d$) has, in one example of construction, a value of approximately +156 volts and a slope of $20.10^6$ v./sec.

The impulses to be counted are transmitted to the deviation plate of a tube 45 (FIG. 7) associated with a triode 46 which permits its return to zero. By this means, the beam moves rapidly backwards and produces an output impulse which is sufficient to actuate a second tube 47, after ten impulses, while a triode 48 similar to 46 is associated with the tube 47. The return to zero can be effected at any desired moment by applying (through $f$) a negative voltage, of $-20$ v. for example, on the first grid of the tubes 45 and 47. During the counting, the terminal $f$ is at $+11.9$ v. (see also FIG. 6).

The counters can be adapted to indicate any pre-determined number desired by operating the potentiometers 41 and 42. The checking of the number indicated is carried out by pressing in one of the push-rods 41$a$ and 42$a$ which have the effect of bringing the corresponding grid of the tube 40 to the potential of the cathode. The voltage on the sliders of the potentiometers falls suddenly to the value corresponding to the figure chosen. The maximum rate of impulses can be approximately 1,500 per second.

In short, the contact of the feeler 9 with a plant 9$a$ thus changes the state of the tube 32 (FIG. 5) which emits a series of positive impulses, the first of which causes the bi-stable unit 33—34 to swing over. This latter, which then ceases to be receptive for all other impulses coming from 42 even as a result of further contacts possibly made by the feeler and comprised in the pre-determined space, releases the gate 31 (FIG. 4). During this time—and starting from the operation of the second bi-stable device 35—36 up to the end of the last counting of the large number indicated—the implements of the cutter are in the withdrawn position.

The counting of the small number then takes place. When this latter has been achieved, the counter initiates the change-over (through $i$) of the bi-stable device 35—36 which, on the one hand, operates (through $j$) the tube 38 (FIG. 6) and de-excites the electro-magnet 11 (to bring out the implements), and, on the other hand, actuates the counting of the large number indicated. It should be noted that the negative impulse sent on to the bi-stable device 33—34 remains without effect.

When the large number indicated has been reached, the bi-stable device 35—36 pivots again, thereby causing the re-excitation of the electro-magnet 11 and the movement of withdrawal of the implements of the cutter and also causing the bi-stable 33—34 to change-over. This latter again becomes receptive to any impulse which is liable to come from 32 and locks (through $b$) the gate 31. This once again produces the conditions existing at the outset.

It will be observed in this respect that the valve 32, when mounted as a blocked oscillator as indicated above, ensures the release of the bi-stable unit 33—34, even if the feeler 9 is in uninterrupted contact with plants which are assumed to be in very close contact with each other without any break of continuity.

The impulse generator 16 continues to emit as a function of the forward movement of the tractor, but the impulses are no longer transmitted to the counter; the implements of the cutter remain in the retracted position. This situation continues to prevail as long as the feeler 9 has not detected the presence of a new plant, such as plants 1 or 3 of FIG. 1.

As explained in the foregoing description, the action of the probe or feeler, on encountering one of these plants, produces the opening of the gate at the input of the counter which registers the small predetermined number of impulses, then sends a control signal which cuts off the excitation of the electro-magnet and puts the implements into action. The cutter is then in a position beyond the plant 1 or 3 which has thus been saved and the hoeing operation commences.

The counter then registers the large pre-determined number of impulses which corresponds to a distance covered by the tractor and, when this large number has been reached, a control signal is emitted which produces the re-excitation of the electro-magnet and the withdrawal of the implements, thereby making it possible to save a plant such as 5 or 6.

When the probe detects a new plant immediately after 5 or 6, the previous situation is again restored and the hoeing recommences over a new distance $e$. If, on the other hand, the probe finds a space which is devoid of plants, such as 2—3, the implements remain withdrawn until the detection of the first plant which is encountered, namely 3.

In this latter event, it is possible, of course, to ensure that the hoeing operation is not interrupted along the vacant space up to 3.

It will be understood that modifications can be made in the form of embodiment which has been described in the foregoing, especially by the substitution of equivalent technical means, without thereby departing from the scope of the present invention.

Thus the sequence of operation may be reserved: the tools are normally in operative position, the first signal causes them to retract and the second signal to return to operative position. A third counter 26 (see FIGURE 3a) closes the electronic gate until the probe detects a plant.

Moreover, it is quite obvious that transistors may be substituted for the conventional electronic valves, by adapting accordingly the connections.

What is claimed is:

1. In an agricultural machine of the type having a plant-probe, retractable implements adjustable to an operative position wherein they destroy plants lying in their path and to an inoperative position wherein they leave such plants unaffected, and means for setting said implements in one or the other of said positions, an electronic device for the automatic control of said implement setting means, comprising an impulse generator; means responsive to the forward displacement of said machine for the control of said impulse generator whereby an impulse is generated each time said machine moves forward for a pre-determined distance along the ground; an impulse counter adapted to emit control signals after counting pre-determined numbers of impulses, said counter having its input connected to the output of said generator and its output connected to said implement setting means to apply thereto said control signals; and an electronic gate under control of said plant-probe and interposed in the connection between the output of said impulse generator and the input of said impulse counter, the control of said gate by said plant-probe being such that said gate is caused to establish or to interrupt said connection according to whether the probe has or has not detected the presence of a plant.

2. An agricultural machine in accordance with claim 1, comprising pre-determining potentiometers associated with the counter and adapted to permit the individual adjustment of pre-determined numbers of impulses.

3. An agricultural machine in accordance with claim 1, in which the impulse generator comprises a photo-electric cell, a movable shutter which closes off the said cell and means for the transmission of movement of the machine to the said shutter.

References Cited in the file of this patent

UNITED STATES PATENTS

| | | |
|---|---|---|
| 2,535,720 | Boncompain | Dec. 26, 1950 |
| 2,804,004 | Hubalek et al. | Aug. 27, 1957 |